US008068262B2

(12) United States Patent
Winteraeken et al.

(10) Patent No.: US 8,068,262 B2
(45) Date of Patent: Nov. 29, 2011

(54) IMAGING SYSTEM FOR PROCESSING A MEDIA

(75) Inventors: Stefan A. C. J. Winteraeken, Roermond (NL); Franciscus J. W. M. Wolters, Nijmegen (NL)

(73) Assignee: OCE-Technologies B.V., Venlo (NL)

( * ) Notice: Subject to any disclaimer, the term of this patent is extended or adjusted under 35 U.S.C. 154(b) by 291 days.

(21) Appl. No.: 12/483,376

(22) Filed: Jun. 12, 2009

(65) Prior Publication Data

US 2009/0251740 A1 Oct. 8, 2009

Related U.S. Application Data

(63) Continuation of application No. PCT/EP2007/063589, filed on Dec. 10, 2007.

(51) Int. Cl.
*H04N 1/04* (2006.01)

(52) U.S. Cl. ........ 358/474; 358/493; 358/498; 358/497; 399/81; 347/12

(58) Field of Classification Search .................. 358/474, 358/497, 496, 498, 493; 399/81, 364, 367; 347/12
See application file for complete search history.

(56) References Cited

U.S. PATENT DOCUMENTS 6,519,424 B2 * 2/2003 Matsuura et al. ............... 399/45
6,633,414 B1 * 10/2003 Matsuda et al. .............. 358/474
6,908,168 B2 * 6/2005 Kawaguchi ..................... 347/12
7,390,085 B2 * 6/2008 Ishii et al. ..................... 347/104
7,433,095 B2 * 10/2008 Iizuka et al. .................. 358/481
7,650,093 B2 * 1/2010 Suzuki ............................ 399/39
2002/0176719 A1 * 11/2002 Yogome et al. ................. 399/81
2004/0036728 A1 * 2/2004 Kawaguchi ..................... 347/12
2005/0225279 A1 10/2005 Hatada
2005/0237548 A1 * 10/2005 Suzuki ........................... 358/1.9
2006/0133833 A1 * 6/2006 Matsuura et al. ............... 399/45
2006/0182482 A1 * 8/2006 Shibagaki et al. ............ 400/319
2009/0223119 A1 * 9/2009 Brusletto et al. ................ 44/590

FOREIGN PATENT DOCUMENTS

EP 0 881 820 A2 12/1998
JP 61-222756 A 10/1986

* cited by examiner

*Primary Examiner* — Negussie Worku
(74) *Attorney, Agent, or Firm* — Birch, Stewart, Kolasch & Birch, LLP

(57) ABSTRACT

An imaging system for processing a media includes a media transport path, an imaging station, a displacement device that controllably displaces the media along the media transport path relative to the imaging station, and a controller assembly. The controller assembly includes a feedback filter, a feedforward filter, a low-pass filter and a memory that stores and time delayed releases control data. During operation, the displacement device is actuated in response to an actuation command generated by the controller assembly. The actuation command has a feedback component based on a filtering by the feedback filter of an error signal including information about the position error between a desired and an actual position of the media and a feedforward component based on a time delayed, low-pass filtered, frequency dependent filtering of the error signal by the feedforward filter. The feedforward filter is configured such that the closed-loop controlled characteristics of the displacement device are compensated.

17 Claims, 3 Drawing Sheets

IMAGING SYSTEM FOR PROCESSING A MEDIA

CROSS-REFERENCE TO RELATED APPLICATIONS

This application is a Continuation of copending PCT International Application No. PCT/EP2007/063589 filed on Dec. 10, 2007, which designated the United States, and on which priority is claimed under 35 U.S.C. §120. PCT International Application No. PCT/EP2007/063589 claims priority to Application No. 06127066.6, filed in Europe on Dec. 22, 2006. The entire contents of each of the above-identified applications are hereby incorporated by reference.

BACKGROUND OF THE INVENTION

1. Field of the Invention

The present invention relates to an imaging system for processing a media, including a media transport path, an imaging station arranged along the media transport path, a displacement device that controllably displaces the media along the media transport path relative to said imaging station, and a controller assembly.

2. Description of Background Art

In known imaging systems the media is positioned relative to the imaging station by means of commonly known transport pinches, which are driven by electric motors. The increasing demands for higher image quality and speed result in increasingly strict demands of positioning precision of the media with respect to the imaging station. For example, in a printing system, where an image of marking material is applied on a print media, the print media is displaced stepwise relative to the printing station such that the image can be applied in several swaths. In such systems, print media has to be positioned at the exact required position when the marking material is applied. Any deviation of the position of the print media relative to the printing station may result in a degraded image quality, as a result of misplacement of particles of marking material on the print media. In general, due to the stricter positioning requirements, it becomes increasingly more difficult to satisfy the strict positioning tolerances. This imposes higher requirements for the mechanical construction of the displacement device of the media and for the specifications of the electrical drive that is used for driving the displacement device. In general, this leads to an increasingly more complex and expensive construction of the known imaging systems.

SUMMARY OF THE INVENTION

It is an object of the present invention to provide an imaging system with an increased performance with respect to the positioning of a media, without increasing the complexity of the mechanical structure.

To this end, according to the present invention, the controller assembly comprises a feedback filter, a feedforward filter, a low-pass filter and a memory that stores and time delayed releases control data, wherein during operation, the displacement device is actuated in response to an actuation command generated by the controller assembly, the actuation command having: a feedback component based on a filtering by the feedback filter of an error signal comprising information about the position error between a desired position and the actual position of the media; and a feedforward component based on a time delayed, low-pass filtered, frequency dependent filtering of the error signal by the feedforward filter, the feedforward filter being configured such that the closed-loop controlled characteristics of the displacement device are compensated.

Thus, the positioning requirements of a media relative to the imaging station are met or even improved, while the mechanical complexity of the overall imaging system is not increased. The feedback component is used to correct for incidental errors while the feedforward component corrects for structural influences that negatively influence the positioning of the media. Incidental errors may for example include disturbances due to ground vibrations as a result of the operation of neighboring instruments, or manual disturbances imposed on the media or on the media positioning device. Structural influences may include, for example, the unroundness of an axle or skew of a driven pinch roller.

In an embodiment of the present invention, the feedforward filter is configured such that a frequency transfer function of the feedforward filter is substantially equal to an inverse of a process sensitivity of the controlled displacement device. As the process sensitivity is a good indication for the behavior of the closed-loop controlled system, the compensation of the closed-loop controlled system characteristics is well reached by the implementation using the inverse of the process sensitivity.

The better the feedforward filter compensates the closed-loop controlled behaviour, the better the feedforward component will be able to improve the performance. The process sensitivity may be theoretically modelled or measured, e.g. by a frequency response measurement. The implementation of the feedforward filter may be adapted to correct for any occurring instabilities, due to unstable poles or zeros.

In another embodiment of the present invention, during operation, the actuation of the displacement device has a repetitive character with a period of repetition, and the low-pass filtered, frequency dependent filtering of the error signal by the feedforward filter is time delayed for a delay period T substantially equal to the period of repetition.

Thus, any recurring disturbances to the control of the displacement device are thereby accounted for by the feedforward component. As neither the feedback nor the feedforward filter is able to foresee future disturbances, the delay period of the feedforward actuation component enables a better and faster correction of recurring disturbances.

In a further embodiment of the present invention, during operation, the memory is configured for storing a signal comprising a low-pass filtered signal, composed of the frequency dependent filtering of the error signal by the feedforward filter added to the output signal of the memory, wherein the output of the memory is the stored signal delayed by one delay period T.

A synthesized feedforward component is thus applied with a delay of one period, thereby correcting for any recurring disturbances. The feedforward component is updated based on current observations for a better correction during the next period of repetition.

In another embodiment of the present invention, the imaging system further comprises a sensor that measures a position of the media, and wherein the error signal is based on the measured position of the media.

Measuring the position of the media directly, results in a controlled system that uses the actual required quantity, being the position of the media relative to the imaging station, to base the actuation commands on. Any indirect measurements may result in a less accurate control of the required quantity. To measure the position of the media for instance, an optical sensor, such as a CCD-sensor may be used, for determining the position of a media relative to a predetermined marker location.

In another embodiment of the present invention, the displacement device comprises a drivable transport pinch, a sensor that measures the orientation or the amount of rotation of the drivable transport pinch, and wherein the error signal is based on the measured position of the drivable transport pinch.

The measurement of the rotational position drivable transport pinch is less complex than a measurement of the actual position of the media, while the difference between the rotational position of the drivable pinch and the associated position of the media relative to the imaging station is relatively small if the properties of the pinch are relatively well known.

In another embodiment of the present invention, the displacement device comprises a drive motor, a sensor that measures the position of the drive motor, in particular of the drive shaft of the motor, and wherein the error signal is based on the measured position of the drive motor.

It is relatively easy to obtain the rotational position of the drive shaft of a motor. A rotational encoder disk may be fixed to the drive shaft, or an internal position encoder may be integral part of the electric motor.

In another embodiment of the present invention, the feedback filter comprises a proportional component acting on a magnitude of the error signal and a derivative component acting on a rate of change of the error signal.

The resulting feedback filter will result in a fast correction of incidental disturbances, while the derivative component introduces enough damping to the controlled system to overcome problems due to overshoot. In imaging systems, it is undesired to oscillate a media during positioning thereof and the media should be in the correct position within a relatively small amount of time.

In another embodiment of the present invention, the frequency dependent filtering of the error signal by the feedforward filter is amplified with a robustness factor.

To cope with a certain degree of model uncertainties, the filtered error signal, which is outputted by the feedforward filter 103 is filtered by a robustness filter 104. This robustness filter is an amplifier with an amplifying factor equal to the robustness factor. Preferably, the robustness factor is a value between 0 and 1. Good results have been observed with a robustness factor of approximately 0.5, which results in a 6 dB error margin.

In another embodiment of the present invention, the low-pass filter imposes a phase shift when filtering. Non-zero phase low-pass filters demand less computational capacity than zero phase low-pass filters.

In another embodiment of the present invention, the actuation command is further composed from a parametric feedforward component based on a reference signal, comprising information about a desired position of the media. An additional parametric feedforward component decreases the time to decrease the settling time.

The parametric feedforward component may comprise a compensation for a Coulomb and/or viscous friction of the displacement device. It may also comprise a compensation for an acceleration inertia of the displacement device. The parametric feedforward component enables a performance improvement by incorporating system knowledge of the system that is to be controlled. The parameters of the parametric feedforward component may be tuned in advance, e.g. after manufacturing, or alternatively during a short calibration procedure during the start-up of the apparatus.

In an embodiment of the present invention, the imaging station comprises a printing station for applying marking material onto the media. This may, for example, be based on electrographic, inkjet or laser printing principles, using, for example, water-based inkjet, solvent or hotmelt ink, binary toner or the like. To increase the image quality of such systems, it is of high importance to position the media within very strict specifications, such as media position relative to the imaging station.

In another embodiment of the present invention, the imaging station comprises a scanner station for digitizing image data from the media. To enable an efficient scanning process with good image quality, it is very important to have a well-defined media positioning.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
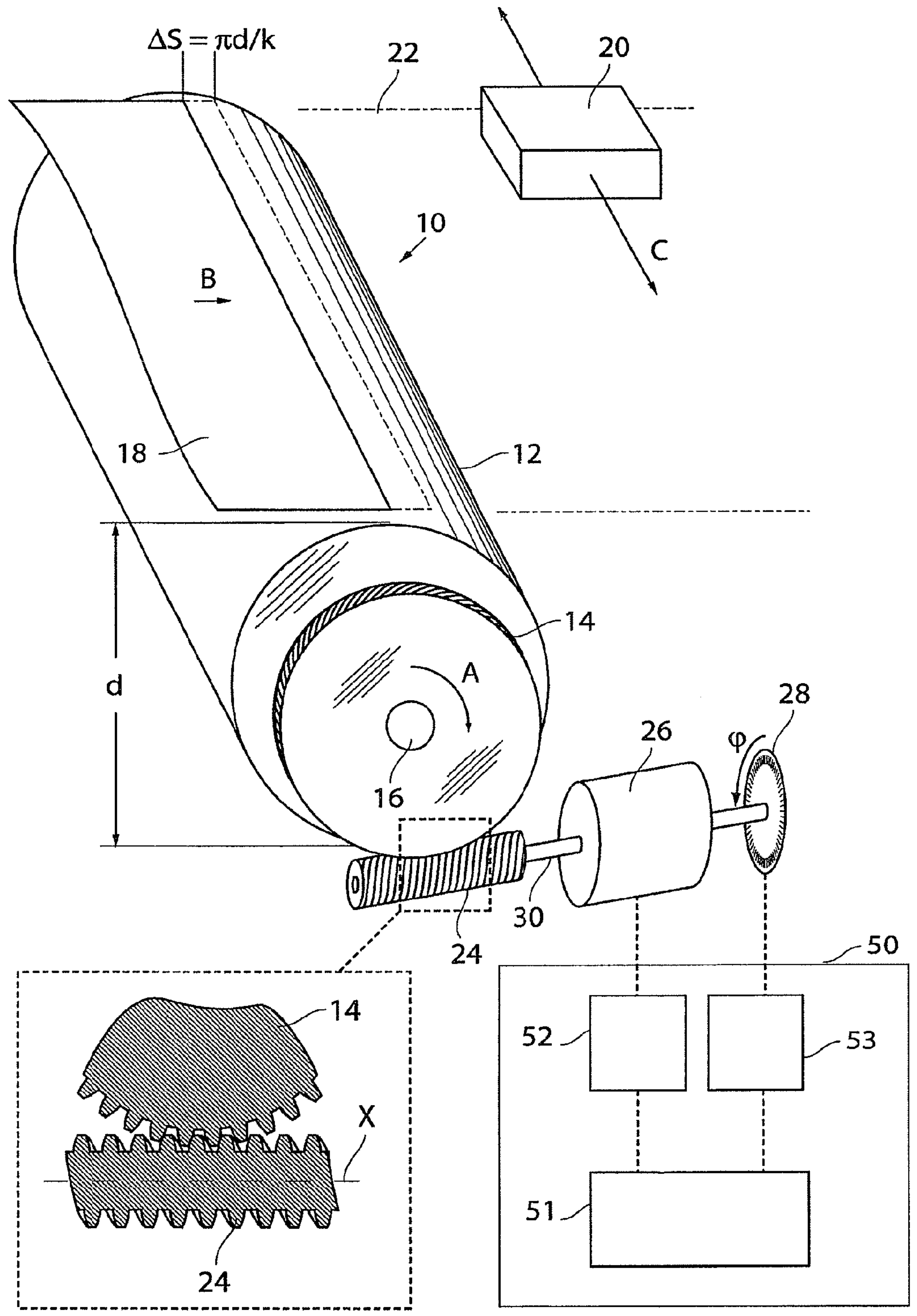
FIG. 1 is a schematic perspective view of a printer according to the present invention.

The present invention will now be described with reference to the accompanying drawings, wherein the same reference numerals have been used to identify the same or similar elements throughout the several views.

As is shown in FIG. 1, a rotary unit 10 of an imaging system such as a printer, e.g. an inkjet printer, comprises a feed roller 12 and a worm wheel 14 mounted for joint rotation on a common axle 16. When the rotary unit 10 is rotated in the direction of an arrow A, a sheet of a print media 18, e.g. paper, is advanced in a direction B relative to a printhead 20 along a media transport path 22. The direction B is the media transport direction or sub-scanning direction of the printer, whereas the main scanning direction C, is the direction in which the printhead 20 moves back and forth across the media transport path 22.

A worm 24 is mounted to mesh with the worm wheel 14 and is driven by an electric motor 26. A disk-type encoder 28 is mounted on a drive shaft 30 of the motor 26 so as to detect angular increments by which the worm 24 is rotated in a direction $\phi$. By way of example, the encoder 28 may have 500 slots, so that, utilizing quadrature encoding, it is possible to detect the angular increments with a resolution of 2000 per revolution of the worm 24.

The worm gear formed by the worm 24 and the worm wheel 14 provides a very small transmission ratio 1/k<<1, so that a relatively large angular displacement of the worm 24 leads only to a relatively small advance of the media 18. Thus, in principle, the encoder 24 permits to fine-control the media advance with very high accuracy. The number k is preferably an integer and indicates the number of turns that the worm 24 has to make for causing the rotary unit 10 to make one complete turn. Thus, when the worm 24 is rotated by 360° (a full turn), the media 18 will be advanced by a unit length $\Delta S=\pi d/k$, with d being the diameter of the feed roller 12.

A controller assembly 50 is adapted to receive measurements from encoder 28 by means of an input module 53 and sends actuation signals to the motor 26 by means of an output module 52. A processor module 51 controls the input module 53 and output module 52. The output module 52 comprises a motor driver 52 which transforms the digital signal of the processor module 51 into a signal, such as a certain voltage, current or pulse frequency, that the motor can interpret or use directly to rotate the rotary axle 30 so as to advance the media 18 by a required length, each time the printhead 20 has performed a pass across the media 18.

The controller assembly 50 communicates with a printer controller (not shown) to determine the moment and amount of required movement of the feed roller 12. Depending on this communication, a desired position or motion of the worm 24 is determined by the processor module 51.

It will be clear that alternative drive arrangements may profit from the same type of controller assembly as well. For example, a direct drive feed roller, which is driven directly on the axle of rotation, or a belt driven feed roller.

Figure 2A:
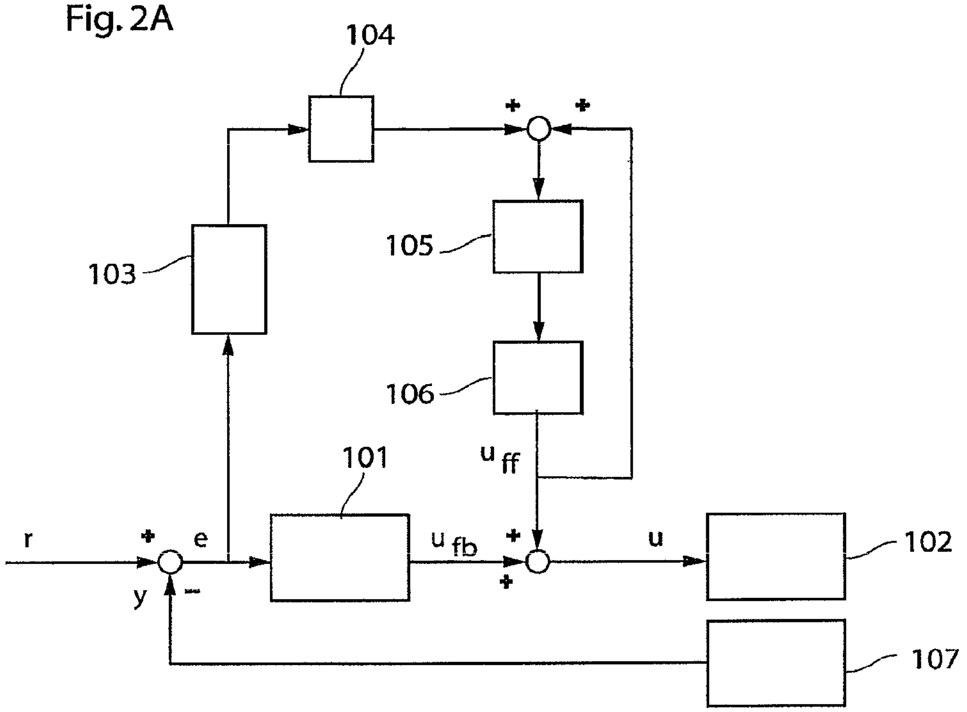
FIG. 2A is a schematic view of a control process within the controller assembly according to the present invention.

FIG. 2A shows a schematic view of a control process within the controller assembly 50. The controller assembly 50 receives a signal from the printer controller indicating the required position of the drive shaft 30. It will be clear that the printer controller may also indicate a required position of the print media 18, of the feed roller 12, of the worm wheel 14 or any other indication of a position of a direct or indirect controlled part of the system. This indication of the required position of the drive shaft 30 is inputted in the control process as the reference signal r.

The input module 53 of the controller assembly 50 receives measurements from the encoder 28 on the drive shaft 30. This indication of the position of the drive shaft 30 is fed into the control process as the output signal y. In an alternative embodiment, the position of the media 18 relative to the imaging station 20 is measured as an output. The measurements of the position of the encoder 28 are received, digitized and transformed for use in the control system in receiving unit 107. The difference between the reference signal r and the output signal y is called the error signal e. The error signal is an indication of the difference between the required position of the drive shaft 30 and the actual or measured position of the drive shaft 30.

The controller assembly comprises a feedback filter 101. This feedback filter 101 uses the error signal e to synthesize a feedback component of the actuation command u that the output module 52 can use to drive the electric motor 26. The digital signal output module 102 sends a digital signal comprising information about the actuation command u to the output module 52 of the controller assembly. The output module 52 transforms the digital signal into a signal that the electric motor can interpret or use directly to drive the drive shaft 30.

The feedback filter 101 is a linear feedback filter and is configured to react on several properties of the error signal e. The feedback filter 101 comprises a proportional part, which responds to the magnitude of the error signal e. The larger the error signal is, the larger the contribution to the actuation command will be. Thus, a large difference between the required position and the actual or measured position of the drive shaft 30 will result in a proportionally large actuation of the electric motor until the difference is smaller.

The feedback filter 101 further comprises a derivative part, which responds to the rate of change of the error signal e. The larger the rate of change of the error signal e, the larger the contribution to the actuation command will be. Thus, the electric motor will be actuated more intensely if the difference between the required position and the actual or measured position of the drive shaft 30 changes fast and the actuation will be smaller if the change of the error is smaller.

Alternatively, the feedback filter may also comprise an integrating part, which responds to the time-integrated amount of difference between the required and the actual position of the drive shaft 30.

The process of determining an actuation command to send to the electric motor by responding to the error signal, which comprises information about the difference between a required position and an actual position, may be considered as a closed-loop. This closed control loop operates at a predetermined frequency f. Depending on the operating frequency f, after each time period Ts, being equal to the inverse of the operating frequency 1/f, a new actuation command is synthesized by the feedback filter 101. The time period Ts is called the sample time of the control system. It is preferred that at least once in every sample time a new measurement of the position of the drive shaft is available.

The closed-loop-controlled drive shaft 30 has certain closed-loop-controlled characteristics depending on the tuning of the feedback filter 101 and on the system characteristics of the drive shaft 30 itself. These characteristics determine how the controlled drive shaft 30 will react on a certain reference or sequence of references. Ideally, the output of the controlled system should be instantaneously and exactly equal to the required output. In this case, the position of the drive shaft should ideally be exactly equal to the required position after each and every sample time Ts. In practice, this will generally not be the case. The system needs some time to overcome the distance and this will take some time. Besides these physical limitations, in practice there may be incidental or structural irregularities, which introduce a disturbance to the output. For example, the unroundness of the drive axle, or irregularities in the worm gear may result in disturbances to the position control of the drive shaft 30.

The control assembly 50 further comprises a feedforward filter 103. The feedforward filter 103 is configured such that the closed-loop controlled characteristics of the closed-loop controlled system are compensated.

The closed-loop controlled system's characteristics may be modelled by the process sensitivity Sp. This process sensitivity Sp is a transfer function that describes the relation between a certain reference or sequence of references and the output of the closed-loop controlled system.

The feedforward filter 103 is configured to equal or at least approximate the inverse of the process sensitivity Sp. Ideally, the relation between the reference signal and the output of the controlled system is a one-to-one relationship, i.e. the output of the controlled system would be instantaneously and exactly equal to the reference. In general, the process sensitivity is not equal to one for all reference signals. By adding an additional feedforward component to the feedback component of the actuation command, which feedforward component is based on the inverse of the process sensitivity, the transfer function of the resulting feedback and feedforward controlled system is a better approximation of the desired one-to-one relationship.

Feedforward filter 103 is implemented as a digital filter that equals the inverse of the process sensitivity Sp of the controlled system. The process sensitivity Sp of the controlled system or an approximation thereof may be measured directly, but may alternatively also be constructed theoretically, by modelling or measuring the transfer functions of the feedback filter and the system or process that is to be controlled. The process sensitivity that is used for designing the feedforward filter 103 is constructed from a theoretical modelling of the controller and frequency response measurements of the electrically driven feed roller 12.

To cope with a certain degree of model uncertainties, the filtered error signal, which is outputted by the feedforward filter 103, is filtered by a robustness filter 104. This robustness filter is an amplifier with an amplifying factor between 0 and 1. To incorporate robustness against 6 dB model-uncertainties the robustness filter 104 is set to 0.5.

The modelling and frequency response measurements of the process sensitivity of the electrically driven feed roller 12 are accurate for lower frequencies but become increasingly less accurate for high frequency effects. Nevertheless, inverting the process sensitivity Sp for use in the feedforward filter 103 increases the influence of the high frequency effects, which are determined with a relatively low degree of accuracy. Therefore, the filtered error signal that is outputted by the feedforward filter 103 is fed through a low-pass filter 105, which filters out all signals above a predetermined frequency. This frequency is called the cut-off frequency. Because high frequency actuation of the drivable feed roller 12 does not have a significant influence on the controlled system, and because the high frequency modelling of the feedforward filter is less accurate, the low pass filtering of the feedforward component of the actuation command does not deteriorate the controlled system.

The low-pass filter is implemented as a zero phase low pass filter, thus the low-pass filter imposes no phase shift on the signal when filtering.

The reference signal of the imaging system, in particular the reference signal of the displacement device, e.g. the feed roller, has a highly repetitive character. After each scanning movement of the printhead 20 in the main scanning direction C, the media is advanced in the transport direction B. To advance the media accurately over a predetermined distance ΔS, the worm 24 is rotated over exactly one complete revolution, i.e. 360°. Driving the worm 24 for a full revolution after each swath of the printhead 20 is a highly repetitive reference signal with a period of repetition Tr.

Neither the feedforward filter 103, nor the feedback filter 101 can foresee future events. Disturbances that occur during each repetition of the controlled movement, such as unroundness of the drive shaft 30 or irregularities of the worm 24 or worm wheel 16 can only be acted upon after they have occurred and after they have been detected by the position sensor 28.

A memory 106 is implemented, which is configured to store a signal comprising the low-pass filtered signal, composed of the frequency dependent filtering of the error signal by the feedforward filter 103 added to the output signal of the memory 106 itself, wherein the output of the memory 106 is the stored signal delayed by one delay period, equal to the period of repetition Tr. An actuation command that was calculated to correct for an error in the previous repetition will therefore be applied during the next repetition of the controlled drive shaft motion. The feedforward filter 103 therefore accounts for repetitive errors, while the feedback filter 101 accounts for incidental errors.

Figure 2B:
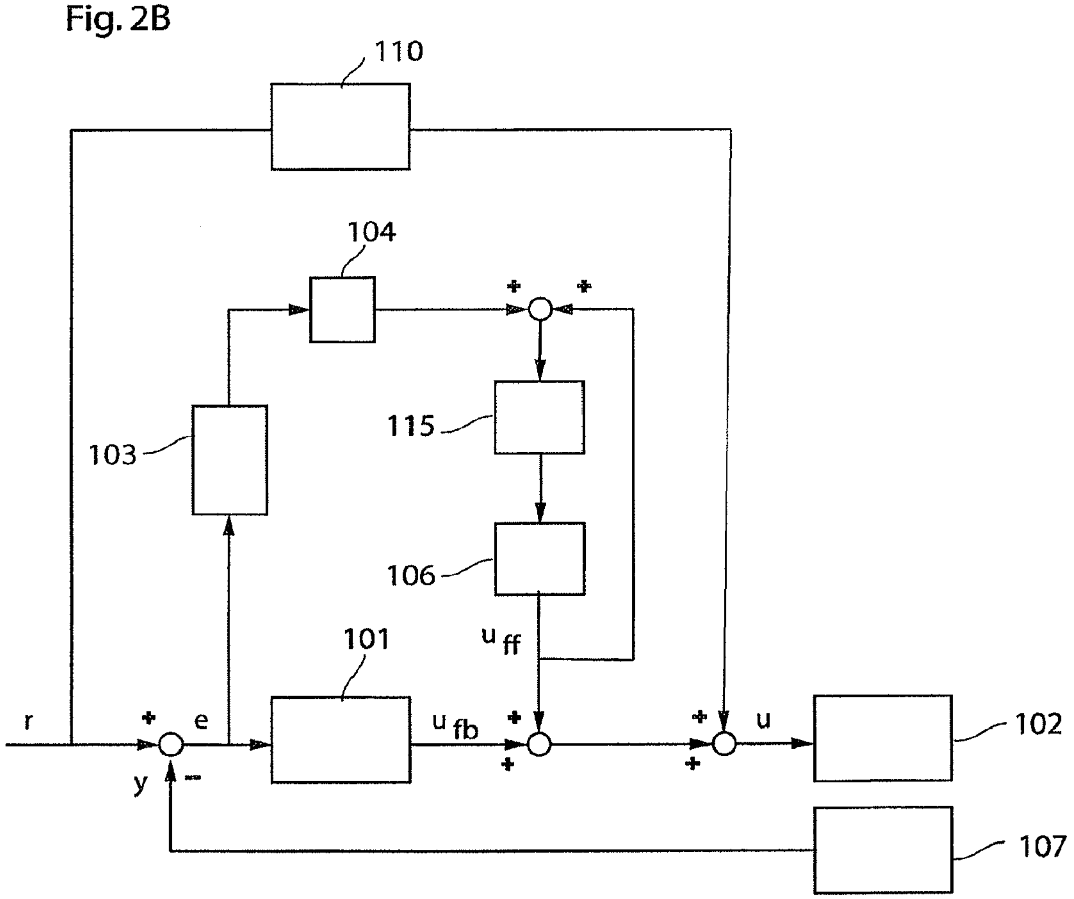
FIG. 2B is a schematic view of an alternative embodiment of the control process within the controller assembly according to the present invention.

FIG. 2B shows a schematic view of an alternative embodiment of a control process within the controller assembly 50. The low-pass filter 115 is implemented as a non-zero phase low-pass filter. Such low-pass filter 115 does impose a phase shift on the signal, but requires less computing capacity with respect to the zero phase low-pass filters.

A phase shift on the control signal may slightly deteriorate the actuation command, but an additional parametric feedforward filter 110 compensates the slight deterioration. The parametric feedforward filter 110 acts on the reference signal r and contributes an additional component to the actuation command. This component comprises a compensation for the Coulomb and viscous friction of the controlled system and compensates for the acceleration inertia of the media displacement device. As these system properties of the controlled system are not expected to change significantly during operation, these compensations can be tuned in advance, or during a short calibration procedure at the start-up of the imaging system. The combination of the parametric feedforward filter 110 and a non-zero phase low-pass filter 115 result in smaller computational demands to the processing module 51.

Figure 3:
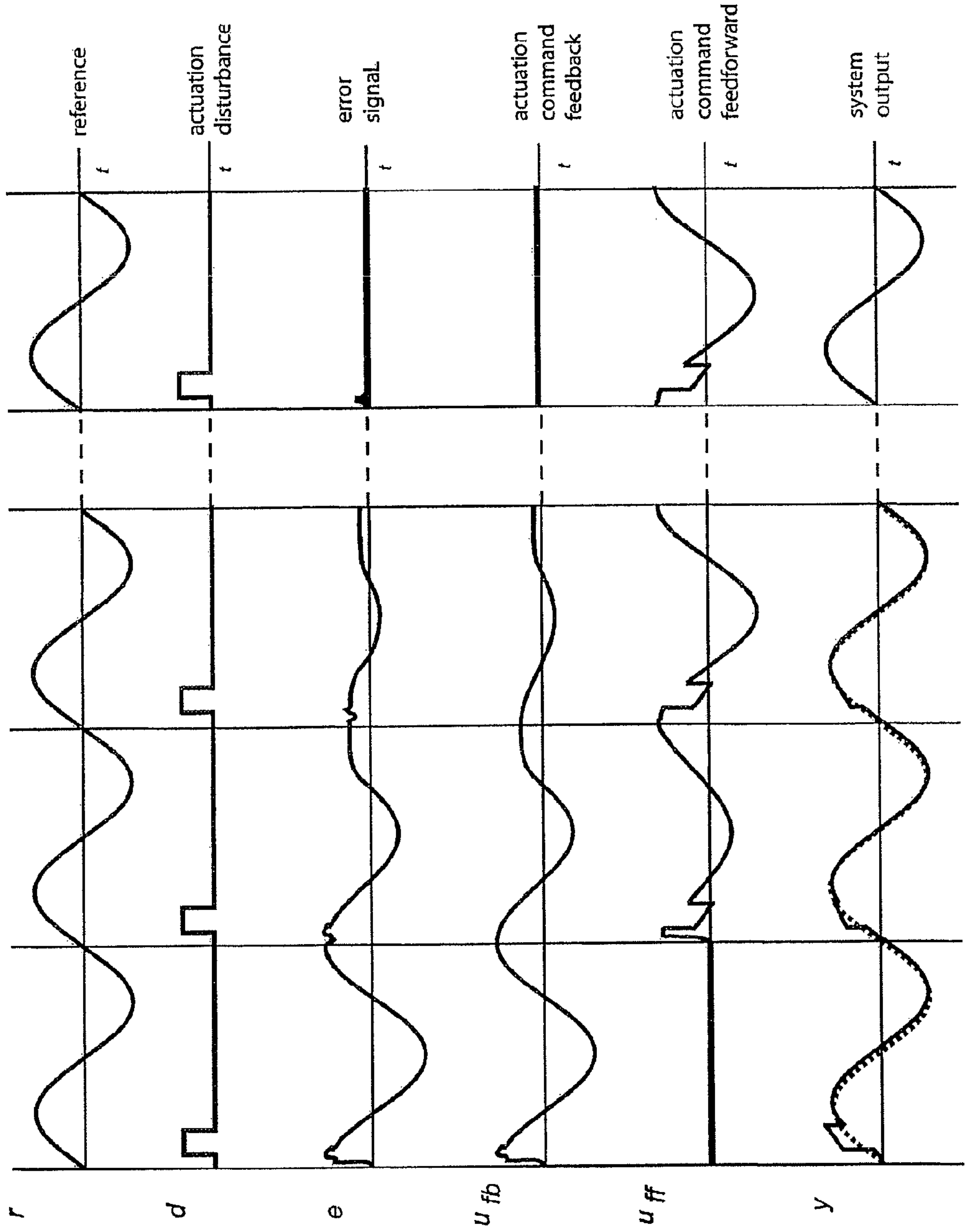
FIG. 3 is a schematic overview of the control process results.

FIG. 3 shows a schematic overview of the control process results in repetition one (I), two (II), three (III) and ten (X). As shown in the first row, the reference in this example is a sine-shaped signal. The controlled system is required to follow a sine-shaped signal formed reference signal. In the second row, the periodic disturbance has been illustrated. This block signal disturbance is imposed in addition to the actuation command. This means that the controlled system applies a combination of a calculated actuation command and the block signal disturbance. The physical reason for this disturbance is irrelevant for this example.

In the sixth row, the measured output of the system has been depicted (solid line) and the reference signal (dashed) has been added for illustrative reasons. The influence of the block disturbance is clearly visible in the first period (I). The error signal formed by the difference between the reference r and the output y is depicted in row three. This error signal is clearly influenced by the disturbance and furthermore comprises sine-shaped influences of the inherent time lag caused by, e.g. the inertia of the rotating parts such as the feed roller 12.

With reference to the first period (I), it is clear that the feedback component (shown in row four, $u_{fb}$) acts on the actual error signal, while the feedback component (shown in row five, $u_{ff}$) has no effect yet.

With reference to the second and third period, as shown in columns two (II) and three (III), it is noted that the feedforward component of row five ($u_{ff}$) now clearly incorporates a part of the sine-shaped feedback command of the first period and further an inverse block-shaped part has been synthesized to compensate for the block-shaped disturbance as detected in the previous period. This trend is increased in the third period and results in a decreasing overall error. Hence, the feedback component is decreased while the tracking performance of the system, i.e. the capability to follow the reference is maintained, or even improved.

After ten periods of repetition (period X) it is clear that the tracking performance is very good, the error approaches zero, the feedforward component has been synthesized to correct for the block-shaped disturbance and the repetitive actuation of the system, while the feedback component corrects for incidental errors only.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An imaging system for processing a media, comprising:

a media transport path;

an imaging station arranged along said media transport path;

a displacement device that controllably displaces the media along said media transport path relative to said imaging station; and a controller assembly, the controller assembly comprising:

a feedback filter;

a feedforward filter;

a low-pass filter; and a memory that stores and time delayed releases control data, wherein during operation, the displacement device is actuated in response to an actuation command generated by the controller assembly, the actuation command having:

a feedback component based on a filtering by the feedback filter of an error signal comprising information about the position error between a desired position and the actual position of the media; and a feedforward component based on a time delayed, low-pass filtered, frequency dependent filtering of the error signal by the feedforward filter, the feedforward filter being configured such that the closed-loop controlled characteristics of the displacement device are compensated.

2. The imaging system according to claim 1, wherein the feedforward filter is configured such that a frequency transfer function of the feedforward filter is substantially equal to an inverse of a process sensitivity of the controlled displacement device.

3. The imaging system according to claim 1, wherein during operation the actuation of the displacement device has a repetitive character with a period of repetition, and the low-pass filtered, frequency dependent filtering of the error signal by the feedforward filter is time delayed for a delay period T substantially equal to the period of repetition.

4. The imaging system according to claim 3, wherein during operation the memory is configured for storing a signal comprising a low-pass filtered signal, composed of the frequency dependent filtering of the error signal by the feedforward filter added to the output signal of the memory, and the output of the memory is the stored signal delayed by one delay period T.

5. The imaging system according to claim 1, further comprising a sensor for measuring a position of the media, and wherein the error signal is based on the measured position of the media.

6. The imaging system according to claim 1, wherein the displacement device comprises a drivable transport pinch and a sensor that measures a position of the drivable transport pinch, and wherein the error signal is based on the measured position of the drivable transport pinch.

7. The imaging system according to claim 1, wherein the displacement device comprises a drive motor and a sensor that measures a position of the drive motor, and wherein the error signal is based on the measured position of the drive motor.

8. The imaging system according to claim 1, wherein the feedback filter comprises a proportional component acting on a magnitude of the error signal, and a derivative component acting on a rate of change of the error signal.

9. The imaging system according to claim 1, wherein the frequency dependent filtering of the error signal by the feedforward filter is amplified with a robustness factor.

10. The imaging system according to claim 9, wherein the robustness factor is a value between 0 and 1.

11. The imaging system according to claim 1, wherein the low-pass filter imposes a phase shift when filtering.

12. The imaging system according to claim 1, wherein the actuation command is further composed from a parametric feedforward component based on a reference signal, comprising information about a desired position of the media.

13. The imaging system according to claim 12, wherein the parametric feedforward component comprises a compensation for a Coulomb friction of the displacement device.

14. The imaging system according to claim 12, wherein the parametric feedforward component comprises a compensation for a viscous friction of the displacement device.

15. The imaging system according to claim 12, wherein the parametric feedforward component comprises a compensation for an acceleration inertia of the displacement device.

16. The imaging system according to claim 1, wherein the imaging station comprises a printing station for applying marking material onto the media.

17. The imaging system according to claim 1, wherein the imaging station comprises a scanner station for digitizing image data from the media.

* * * * *